(12) United States Patent
Ferguson et al.

(10) Patent No.: US 6,263,395 B1
(45) Date of Patent: Jul. 17, 2001

(54) SYSTEM AND METHOD FOR SERIAL INTERRUPT SCANNING

(75) Inventors: Patrick L. Ferguson, Cypress; Paul B. Rawlins, Spring; David F. Heinrich, Tomball, all of TX (US); Robert L. Woods, Allentown, PA (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/227,510

(22) Filed: Jan. 6, 1999

(51) Int. Cl.[7] .................... C06F 13/14; C06F 9/48
(52) U.S. Cl. .................. 710/262; 710/49; 710/128
(58) Field of Search .................. 710/260–269, 710/128, 129, 48–50, 52

(56) References Cited

U.S. PATENT DOCUMENTS

| | | | |
|---|---|---|---|
| 4,253,146 | * | 2/1981 | Bellamy et al. . |
| 5,155,839 | * | 10/1992 | Weppler . |
| 5,414,858 | * | 5/1995 | Hoffman et al. .................. 710/48 |
| 5,555,420 | * | 9/1996 | Sarangdhar et al. .................. 710/266 |
| 5,721,931 | * | 2/1998 | Gephardt et al. .................. 710/260 |
| 5,771,387 | * | 6/1998 | Young et al. . |
| 5,781,187 | * | 7/1998 | Gephardt et al. .................. 710/128 |
| 5,943,500 | * | 8/1999 | Maguire et al. . |
| 6,006,301 | * | 12/1999 | Tetrick .................. 710/128 |
| 6,014,709 | * | 1/2000 | Gulick et al. .................. 709/235 |
| 6,065,088 | * | 5/2000 | Bronson et al. .................. 710/263 |

OTHER PUBLICATIONS

Intel, "82093AA I/O Advanced Programmable Interrupt Controller (IOAPIC)," May 1996, 20 pages.

* cited by examiner

*Primary Examiner*—Paul R. Myers
(74) *Attorney, Agent, or Firm*—Conley, Rose & Tayon, PC; Robert C. Kowert

(57) ABSTRACT

An interrupt controller may serially scan a plurality of interrupt request signals and/or receive interrupt request signals on parallel inputs. A scan latency may be associated with updating the status of serially scanned interrupt requests. Spurious interrupts may result from the scan latency. To reduce the chance of spurious interrupts, serially scanned interrupt requests may be masked for an amount of time following an end of interrupt (EOI). Write cycles to clear interrupt requests may be posted in a write buffer. The delay of such write cycles clearing the write buffer may also result in spurious interrupts. To reduce the chance of such spurious interrupts, EOI cycles may be delayed or retried until the write buffer empties.

53 Claims, 7 Drawing Sheets

SYSTEM AND METHOD FOR SERIAL INTERRUPT SCANNING

BACKGROUND OF THE INVENTION

1. Field of the Invention

This disclosure relates to interrupts within a computer system and, more particularly, to serially scanning interrupt signals and avoiding associated spurious interrupts in a computer system

2. Description of the Related Art

A typical computer system contains at least one interrupt service provider, usually a central processing unit (CPU), and a number of input/output (I/O) devices peripheral to the CPU(s). These I/O devices commonly include hard disk drives, optical disk drives, video adapters, parallel ports, serial ports, and other similar I/O type devices. An I/O device may need to alert the CPU(s) or request service when it completes a task or has a status change, such as finishing a data transfer, completing an operation, receiving data, or the occurrence of an error condition.

The typical mechanism for an I/O device to request service from the CPU(s) involves an interrupt request. An interrupt request is generally a hardware signal sent from the requesting device to an interrupt controller to notify a CPU that the I/O device requires service. Other system devices such as timers, direct memory access (DMA) controllers, and other processors may generate interrupt request signals.

One advantage of using interrupts over other techniques, such as polling, is that the CPU is free to perform other operations between interrupts. When a CPU receives an interrupt request, it stops executing the current instruction routine, saves its state, and jumps to an interrupt service routine. The interrupt service routine includes instructions specific to the device requesting the interrupt so that the CPU can respond to the device condition or status change that instigated the interrupt request. When the interrupt service routine is completed, the CPU restores its state and returns to its location prior to the interrupt.

Generally speaking, in a typical system, a programmable interrupt controller receives the interrupt request signals from the various system devices and organizes the requests to be sent to the CPU(s). A typical interrupt controller has a separate input conductor for each interrupt request signal. In PCs, the so called "legacy interrupts" are usually supported in an interrupt controller. Two cascaded 8259-type interrupt controllers may receive the "legacy" interrupt request signals IRQ[15:3, 1]. Historically, IRQ2 has been used for cascading the 8259 interrupt controllers and IRQ0 is often implemented as an internal timer interrupt. In more modern systems, the interrupt controller may receive additional interrupts, such as interrupts from a peripheral component interconnect (PCI) bus or system management interrupts. These additional interrupts add additional input conductors to the interrupt controller. In some cases, a custom interrupt controller may have to be designed to handle the additional interrupts. Usually a larger package size will be required for the additional input conductors. To avoid the need for additional input conductors, interrupt requests may share a single input conductor by wired-OR sharing. However, with wired-OR sharing, the interrupt controller cannot determine the source of the interrupt request. Typically, all devices sharing an interrupt input conductor must be polled to determine which device requested the interrupt. Polling may have a detrimental effect on performance.

SUMMARY OF THE INVENTION

An interrupt controller may be provided for receiving a plurality of different interrupt requests on a single input conductor by serially scanning the plurality of interrupt requests. Interrupt requests may be latched external to the interrupt controller and then serially shifted into the interrupt controller. The interrupts may then be mapped to the appropriate 8259 and/or I/O APIC interrupt requests. Serially scanning multiple interrupt request signals into a single serial input effectively increases the interrupt I/O capacity and resolution as compared to receiving all interrupt requests in parallel on dedicated inputs or wired-OR sharing of interrupt request on an input. The interrupt controller may also receive interrupt request on dedicated inputs in parallel to the interrupt requests received serially. Also, more than one serial interrupt scan input may be provided on the interrupt controller so that, for example, two serial streams of interrupt requests may be received in parallel into the interrupt controller in addition to possibly receiving dedicated single interrupt request inputs in parallel to the serial scan inputs.

Interrupt requests that are serially scanned into the interrupt controller have an added latency associated with the input operation. This latency corresponds to the amount of time it takes to reach a particular interrupt request in the serial scan operation. Interrupt requests may be serially scanned one after another into the serial input. Thus, after the status of a particular interrupt request is serially scanned into the interrupt controller, there is a delay or latency while the other interrupt requests are being scanned before the status of that particular interrupt request is again updated during the next scan cycle. This latency provides a window where an end of interrupt (EOI) may be received by the interrupt controller prior to the clearing of the interrupt source that requested the interrupt associated with the EOI. The interrupt may have already been cleared in the device that initially asserted the interrupt request, but due to the scan latency the interrupt request may still appear asserted to the interrupt controller. Thus, upon receiving an EOI the interrupt controller may believe that a new interrupt is being requested and thus generate a spurious interrupt. To avoid this spurious interrupt, a mask may be enabled of duration relative to the scan latency to disable the serial scan input from indicating an active interrupt request after an EOI is received. The serial scan interrupt request input may be masked, or ignored, for an amount of time after an EOI to allow the status of the serially scanned interrupt request to be updated before any new interrupt requests are acknowledged by the interrupt controller. The amount of time for which interrupt requests are masked at the serial input may correspond to the maximum scan latency or may be programmable for a varying amount of time. If the interrupt source is still active at the end of the mask duration, then the interrupt controller may assume that a new interrupt is desired and thus treat the interrupt request as a new active interrupt request. In one embodiment, all serial scanned interrupt requests may be disabled for an amount of time upon receiving an EOI. In another embodiment, only interrupt requests corresponding to the interrupt associated with the EOI are masked. Also, if all interrupt requests are inactive upon receiving an EOI no masking is necessary.

In addition to an interrupt controller, a computer system may included a posted write buffer in a bus interface unit for posting write cycles to peripheral devices or to functional units, such as a DMA controller or timer within the bus interface device. A posted write buffer allows write cycles to complete more quickly on a source bus by quickly accepting the write into the posted write buffer and then later completing the write to the internal device or to the target bus. If a write that is posted is a write to a peripheral device or functional unit to clear an interrupt that has been or is being serviced and an EOI for that interrupt is received at the interrupt controller, then the delay of posting the write in the write buffer may cause the EOI to be received at the interrupt controller before the write to clear the interrupt request has reached it's destination. Thus, the interrupt request may still be asserted when the EOI is received by the interrupt controller even though a write to clear the interrupt was sent before the EOI. The interrupt controller may therefore assert a spurious interrupt since the interrupt request may not have been cleared before the EOI was received due to the delay of the posted write buffer. To avoid such spurious interrupts, the interrupt controller or the device, such as a bus interface unit, in which the interrupt controller is located, may cause EOI cycles to be delayed or retried until the write buffer has emptied. For example, if the bus upon which EOI cycles are received is the PCI bus, the interrupt controller may cause the PCI EOI cycles to be retried until the write buffer is clear.

A computer system may include a central processing unit (CPU) and an interrupt controller configured to provide a signal for causing an interrupt in the CPU. The interrupt controller may be coupled to a peripheral bus and may be included within a device having a first conductor configured to serially scan a plurality of interrupt request signals and provide the status of the interrupt request signals on a serial input. The device may be further configured to receive an end of interrupt (EOI) indication. The device may also be configured to mask the serial input from indicating an active interrupt request for an amount of time following receipt of an EOI. The computer system may also include a peripheral device coupled to the peripheral bus, and this peripheral device may be coupled to a different printed circuit board than the device including the interrupt controller. For example, the peripheral device may include a magnetic or optical storage drive, such as a hardrive or CD ROM drive. Other peripheral devices may include a display for displaying a visual user interface where the display is coupled to the peripheral bus via a graphics device, such as a graphics accelerator card.

The amount of time for which interrupt requests on the serial input may be masked, may correspond to the maximum latency to serially scan an interrupt request signal into the serial input. Alternatively, the amount of time may be programmable. The device may be configured to mask the serial input from indicating an active interrupt request only for the interrupt request signals corresponding to the interrupt request for which the EOI was received. An EOI may be initiated by the CPU upon completion of an interrupt service routine corresponding to an interrupt request. The device may also be configured not to mask the serial input if the status received on the serial input of the interrupt request corresponding to the EOI is already inactive when the EOI is received.

The device may also be configured to post in a buffer a write cycle to clear the interrupt request corresponding to the EOI. The device may receive the EOI as an EOI cycle on the peripheral bus. The device may cause the EOI cycle to be delayed or retried on the peripheral bus until the write to clear the interrupt request has exited the buffer. The write posted in the buffer may be issued to a second peripheral bus or to an internal function unit within the device. The source of the interrupt to which the posted write is directed may be a device on the second peripheral bus or an internal functional unit. The first peripheral bus may include a peripheral component interconnect (PCI) bus, and the second peripheral bus may include an industry standard architecture (ISA) bus.

In addition to having an input conductor for serially scanning a plurality of interrupt request signals, the device may also include a plurality of conductors each configured to receive a separate interrupt request signal in parallel with the serial scan input. The device may also include a second serial scan input configured to serially scan a second plurality of interrupt request signals. To implement the serial scanning, a shift register external to the device may be configured to receive a plurality of interrupt request signals and the device may include a conductor to provide a latch signal for latching the plurality of interrupt request signals into the shift register. The device may include another conductor for providing a shift signal to the shift register to serially shift the status of the latched interrupt request signals to the serial input. The latch signal may be asserted periodically after all interrupt request signals have been shifted out of the shift register. The amount of time for which the serial input may mask receiving active interrupt requests following an EOI may correspond to at least one period of the latch signal.

A method for receiving interrupt requests in a computer system may include serially scanning a first plurality of interrupt request signals into a serial input in a device comprising an interrupt controller. The method may also include receiving an EOI indication within the device. The method further includes ignoring an active interrupt request on the serial input for an amount of time following receipt of an EOI in order to prevent a spurious interrupt due to a latency associated with the serial scanning. The amount of time for which an active interrupt request may be ignored following an EOI may correspond to the maximum latency of the serial scanning. The method further included recognizing a new interrupt request if the serial input still indicates an active interrupt request after the amount of time (mask duration). An interrupt to a CPU may be generated in response to an active interrupt request. Upon receiving an EOI, only ones of the interrupt request corresponding to the EOI may be ignored in one embodiment. If the status of the corresponding interrupt request is already inactive upon receiving the EOI then the serial interrupt requests are not ignored.

A method for receiving interrupt requests in a computer system may include receiving interrupt requests in a device having an interrupt controller. The device may also receive an end of interrupt indication. A write cycle to clear an active interrupt request may be posted to a buffer in the device. When an EOI is received in the device as a cycle on a peripheral bus coupled to the device, the device may cause the EOI cycle to be delayed or retried until the write to clear an interrupt request in the write buffer has exited the buffer. The peripheral bus upon which EOI cycles may be delayed or retried may include a PCI bus.

A method for receiving interrupts may also include receiving a second plurality of interrupt request signals in parallel with each other and in parallel with a serial input scanning a first plurality of interrupt request signals. Also, more than one serial scan input may be provided in parallel. Serially scanning may include latching the first plurality of interrupt request signals in parallel into a shift register external to the device and serially shifting the interrupt request signals out of the shift register and into the serial device on a serial input conductor. The latching may be repeated periodically after all the interrupt requests have been shifted out of the shift register. The amount of time for which the serial interrupt request may be masked following an EOI may correspond to at least one period of the latching.

BRIEF DESCRIPTION OF THE DRAWINGS

Other objects and advantages of the invention will become apparent upon reading the following detailed description and upon reference to the accompanying drawings in which.

Figure 1:
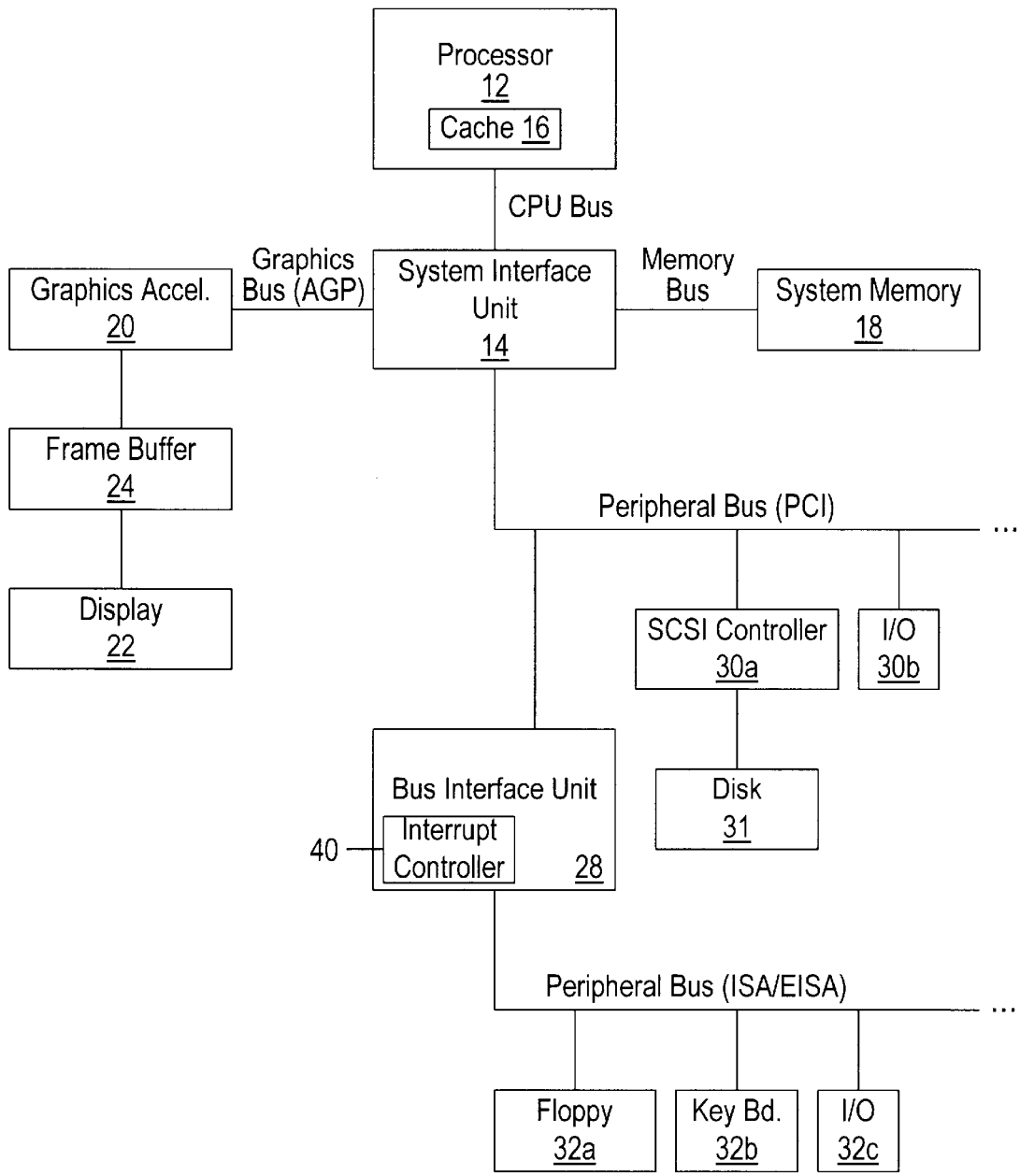
FIG. 1 is a block diagram of a computer system comprising various buses and a bus interface unit including an interrupt controller.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a computer 10 having multiple buses, including a CPU bus, a mezzanine or PCI bus, and a peripheral bus or ISA/EISA bus. The CPU bus connects a CPU or processor (or processors) 12 to a system interface unit or north bridge 14. A cache memory 16 is preferably embodied within processor 12 and/or linked to processor 12 by the CPU bus. System interface unit 14 provides an interface between components located on different buses. System interface unit 14 preferably contains a memory controller which allows communication to and from system memory 18. A suitable system memory 18 may comprise dynamic random access memory (DRAM), extended data out dynamic random access memory (EDO DRAM) synchronous dynamic random access memory (SDRAM) or other suitable memory devices. System interface unit 14 may also include a graphics port to allow communication to a graphics accelerator 20. A graphics port, such as AGP, provides a high performance, component level interconnect targeted at three dimensional graphics display applications and is based on performance extensions or enhancements to PCI. AGP interfaces are generally standard in the industry, the description of which is available from Intel Corporation.

Generally speaking, AGP is physically, logically, and electrically independent of the PCI bus and is intended for the exclusive use of a display device 22 coupled to the graphics port (AGP) by a graphics accelerator 20 and local memory or frame buffer 24. The form and function of a typical graphics accelerator is generally known in the art to render three dimensional data structures which can be effectively shifted into and from system memory 18 to alleviate increased costs of local graphics memory. The graphic accelerator 20 may be embodied on a separate printed circuit board than system interface unit 14 or bus interface unit 28. For example, graphics accelerator 20 may be a plug-in card. Frame buffer 24 is generally understood as any buffer which can capture a frame of memory, defined as a still picture. Display 22 is any electronic display upon which an image or text can be presented. A suitable display 22 includes a cathode ray tube ("CRT"), a liquid crystal display ("LCD"), etc.

System interface unit 14 is generally considered an application specific chip set or application specific integrated circuit ("ASIC") that provides connectivity to various buses, and integrates other system functions such as the main memory interface. System interface unit 14 may be referred to as a north bridge. System memory 18 may be the main memory and refers to a portion of the addressable memory that typically the majority of memory accesses target. System memory is accessed via system interface unit 14, and is typically considered the largest continuous memory space of computer 10.

Unlike the CPU bus which runs at speeds comparable to CPU 12, the PCI bus generally runs at speeds of, e.g., 33 MHz or lower, although it may run at higher speeds such as 60 or 66 MHz. Another bus interface unit 28 is coupled between two dissimilar peripheral buses (i.e., the PCI bus and the ISA/EISA bus). Bus interface unit 28 may be referred to as a south bridge. Similar to unit 14, unit 28 is an ASIC or group of ASICs that provide connectivity between various buses. Attributed to the PCI bus are input/output ("I/O") devices 30, one of which may be a SCSI controller link between, for example, a secondary disk drive and the PCI bus. I/O devices 30 generally operate at higher speeds than I/O devices 32, examples of which include a floppy disk drive, a keyboard, etc. Some I/O devices 30 or 32 may be separate printed circuit cards that plug into a PCI or ISA connector, such as a network interface card for example.

In addition to containing interfaces to the peripheral buses, such as between a PCI bus and ISA bus, bus interface unit 28 also may contain other functional units, such as a direct memory access (DMA) controller, a universal serial bus (USB) interface, and hard drive interface (e.g. IDE), power management logic, configuration logic, and an interrupt controller 40. Note that these functional units may be contained within a single integrated circuit device, or may be implemented in separate devices, or any combination thereof Note that some of these functional units may also be implemented within system interface unit 14. Interrupt controller 40 may thus be implemented within bus interface unit 28, or system interface unit 14, or as a separate device coupled to one of the peripheral buses. For simplicity of discussion however, interrupt controller 40 will be discussed as being located within bus interface unit 28. However, the exact location of interrupt controller 40 is not critical to the invention described herein.

Computer system 10 is merely illustrative of one type of computer system in which the present invention may be employed. However, the present invention may be used in conjunction with any computer architecture which employs interrupts.

Interrupt controller 40 may receive interrupt requests from various devices coupled to the peripheral buses, such as PCI devices or ISA devices. Interrupt controller 40 may include interrupt logic compatible with two cascaded 8259 type interrupt controllers. Support for multiprocessor interrupts may be included, such as I/O advanced programmable interrupt controller (APIC) compatible logic. Interrupt controller 40 may be configured to prioritize and manage interrupt requests received from various peripheral devices or internal devices, such as the DMA controller or timers within bus interface unit 28. An interrupt signal may be asserted by interrupt controller 40 in response to an interrupt request to cause CPU 12 to be interrupted in order to handle the interrupt request.

Figure 2:
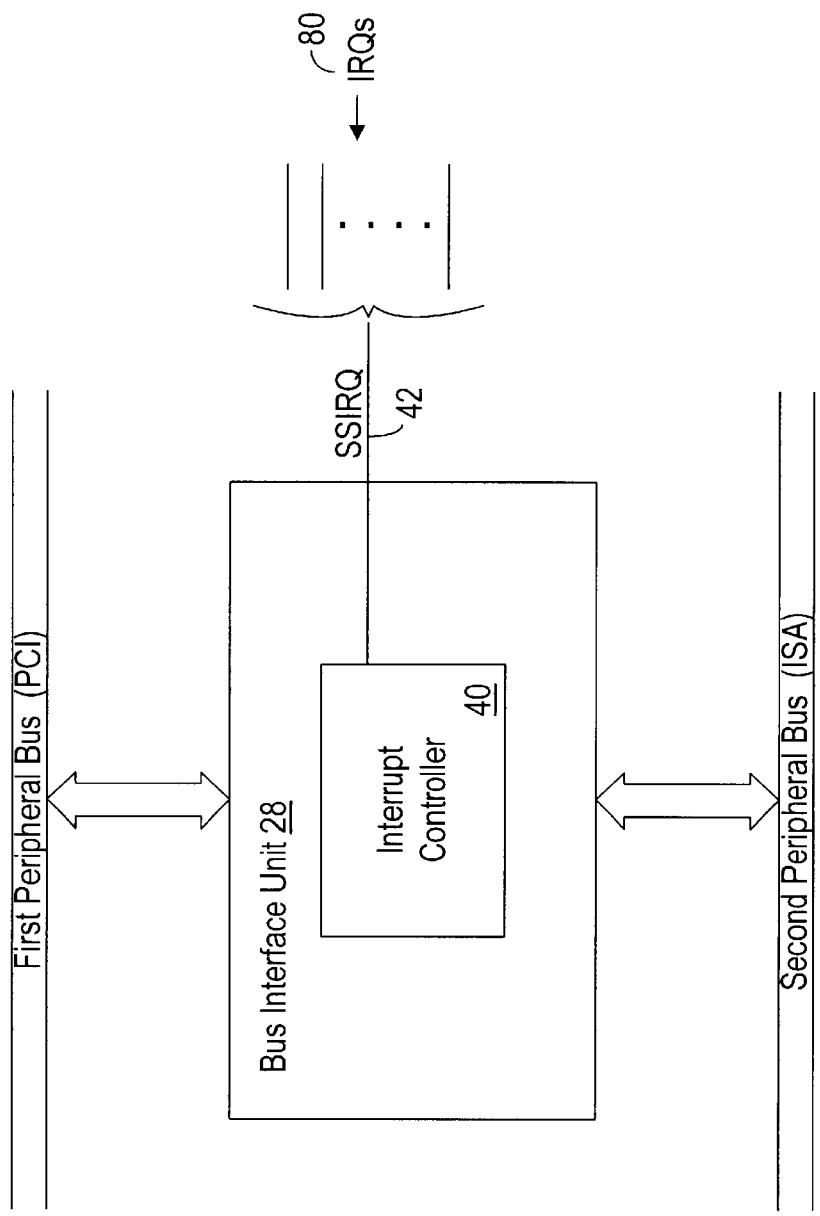
FIG. 2 is a block diagram showing an interrupt controller configured to receive interrupt requests on a serial scan input.

Turning now to FIG. 2, interrupt controller 40 is illustrated with a serial scan interrupt request input 42. Serial scan interrupt request input 42 may be used to receive a plurality of different interrupt request signals 80 into interrupt controller 40 on a single input conductor. The interrupt requests 80 may be serially scanned one after another on serial scan interrupt request input 42. Thus, the status of each interrupt request 80 may be scanned one at a time into interrupt controller 40 on the single input conductor 42. By following a known scanning order, each interrupt request 80 may be appropriately mapped to its corresponding interrupt request to the cascaded 8259 and/or I/O APIC logic within interrupt controller 40.

Interrupt requests 80 may be continuously serially scanned on input 42 into interrupt controller 40. Once scanned into interrupt controller 40, the interrupt requests 80 are then mapped to their corresponding interrupt requests and handled by the 8259 compatible and/or I/O APIC logic as is known in the art. In other words, interrupt controller 40 prioritizes interrupt requests and contains the appropriate in service registers (ISR) and interrupt mask registers and may generate an interrupt signal to cause the CPU to be interrupted in response to the interrupt requests. Typically, upon completion of an interrupt service routine by the CPU, a write is performed to the device requesting interrupt to clear the interrupt request signal 80 asserted by the requesting device and an end of interrupt (EOI) is sent to the interrupt controller to inform the interrupt controller 40 that service of the interrupt has been completed. The EOI indication may be received by the interrupt controller 40 as a cycle on the first peripheral bus, e.g., the PCI bus.

Because of the time required to serially scan each interrupt request 80 into interrupt controller 40 on the serial input 42, the status of each interrupt request 80 may only be updated as fast as all the interrupt requests 80 may be serially scanned. In other words, the serially scanned interrupt requests 80 suffer from the latency of the scan sequence so that a change in the status of one of the interrupt requests 80 may not be scanned into interrupt controller 40 on serial input 42 for a maximum latency of the time required to scan all interrupt requests 80 on serial input 42. During this scan latency, the service of the current interrupt request may be completed and the interrupt request signal may be cleared. While the interrupt requests 80 are being scanned, the EOI cycle may be completed to interrupt controller 40 prior to the corresponding interrupt request being scanned, due to the scan latency. In other words, even though the device that had requested the just completed interrupt is no longer asserting the corresponding one of interrupt requests 80, the corresponding interrupt request may still appear asserted to interrupt controller 40 when the EOI is received due to the serial scan latency. The correct status of the corresponding one of interrupt requests 80 may not be received for a period of time up to the maximum scan latency after a corresponding EOI is received to interrupt controller 40. Therefore, a spurious interrupt may be generated by interrupt controller 40 since interrupt controller 40 may see the corresponding interrupt request still asserted after receiving an EOI. Thus, due to scan latency it may appear to interrupt controller 40 that the device is requesting a new interrupt when in fact the device had already cleared its interrupt request, but the status had not yet been scanned into interrupt controller 40. The scan latency associated with serially scanning interrupt requests into interrupt controller 40 may result in a potential window in which a spurious interrupt may be generated after an EOI is received. The spurious interrupt is an unintended interrupt since the device had already cleared its interrupt request, but the status of the interrupt request had not yet been scanned into interrupt controller 40.

To reduce or eliminate this potential for spurious interrupts when serially receiving interrupt requests 80, the serial scan interrupt request may be masked for an amount of time after receiving an EOI. Interrupt controller 40, or the device in which interrupt controller 40 is implemented, may be configured to mask or ignore the serial scan interrupt request for an amount of time after an EOI is received to prevent the generation of spurious interrupts. The amount of time for which the serial interrupt request may be masked may correspond to the maximum scan latency of the interrupt request 80. Alternatively, other periods of time may be chosen for which the serial interrupt request is masked. The amount of time may also be programmable. For example, a period of time for one to three cycles of the serial interrupt scan may be chosen by programming a register within interrupt controller 40.

In one embodiment, when a EOI cycle occurs to the interrupt controller and the interrupt request is still active, all serial scan interrupts input on serial scan interrupt request conductor 42 are masked regardless of their mapping destination for the amount of time to prevent spurious interrupts. In another embodiment, the mask is implemented on an individual interrupt destination of the interrupt request 80 mapped to the interrupt destination which received the EOI. In this embodiment, only the interrupt requests 80 which may have caused the interrupt for which the EOI was received, are masked. Thus, other ones of interrupt requests 80 are allowed to be input to interrupt controller 40 to possibly generate an interrupt to the CPU. In either of these embodiments, only serially scanned interrupts are masked. Other interrupt requests, such as internal interrupt requests or separate interrupt request input parallel to serial scan interrupt request input 42, are not masked since they do not have an associated serial scan latency. Also, if the status of the interrupt request corresponding to the just received EOI is already inactive, then the serial scan interrupt request will not be masked. If the interrupt status is active when the corresponding EOI is received, the mask will be set for the chosen duration. Upon expiration of the mask duration, if the interrupt source is still active, the interrupt controller 40 then may assume that a new interrupt is desired and thus treat the active status as a new interrupt request. However, active status on serial interrupt requests mapped to the interrupt destination which received the EOI are ignored during the mask duration.

Figure 3:
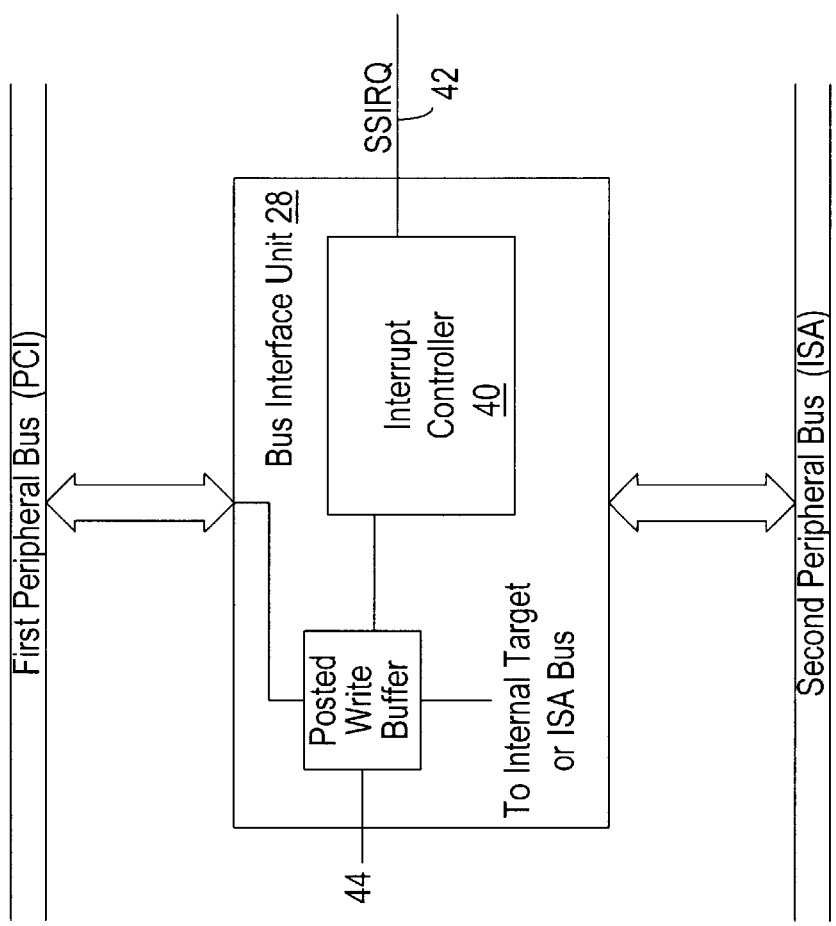
FIG. 3 is a block diagram showing a bus interface unit having an interrupt controller and a posted write buffer.

Turning now to FIG. 3, an embodiment is illustrated in which a posted write buffer 44 is included within bus interface unit 28. Write cycles to various peripheral devices or internal functional units within bus interface unit 28 may be posted within write buffer 44. Some of the writes that may be posted in buffer 44 may include writes to clear the interrupt request signal asserted by a peripheral device or internal functional unit. If other writes are queued within write buffer 44 when a write to clear an interrupt request is received in write buffer 44, there may be a delay before the interrupt request is cleared by the write while the other queued writes are cleared from write buffer 44. If an EOI is received by interrupt controller 40 while a write to clear the corresponding interrupt request is posted in write buffer 44, a spurious interrupt may result. The spurious interrupt may be generated because the EOI may complete to the interrupt controller before the right to clear the interrupt request exits write buffer 44 and reaches the device that had requested the interrupt. Interrupt controller 40 may receive an active status on serial scan interrupt request 42 for the interrupt request from the device for which a clearing write is posted in write buffer 44. Since the right to clear the interrupt request may not yet have reached the device, the serially scanned interrupt request status received by interrupt controller 40 may still be asserted after the EOI has been received. Thus, it may appear to interrupt controller 40 that a new interrupt is being requested due to the delay caused by write buffer 44. Thus, while posting writes in a write buffer may be advantageous to improve write performance, it may also result in spurious interrupts when writes to clear interrupt requests are delayed in the write buffer. Note that the posted write delay may cause spurious interrupts whether or not interrupt requests are scanned serially or received on dedicated inputs. However, if interrupt requests are scanned serially, the serial scan latency may compound the write buffer delay problem.

To reduce the likelihood of a spurious interrupt resulting from a write to clear an interrupt being posted in write buffer 44, interrupt controller 40 or a device in which interrupt controller 40 is implemented, may be configured to cause EOI cycles to be delayed or retried until the write to clear the interrupt request has exited write buffer 44. For example, an EOI may be received as a cycle on the first peripheral bus, e.g. PCI bus. If write buffer 44 is not cleared when an EOI cycle is received, then the EOI cycle may be delayed or retried on the peripheral bus until write buffer 44 is emptied. In another embodiment ISR read cycles on the peripheral bus may also be delayed or retried until write buffer 44 is cleared. By allowing the write to clear the interrupt to exit write buffer 44 before accepting an EOI cycle from the first peripheral bus, the chance of a spurious interrupt due to the delay through write buffer 44 may be reduced. Delaying or retrying EOI cycles may be done regardless if interrupt requests are received serially or in parallel.

Figure 4:
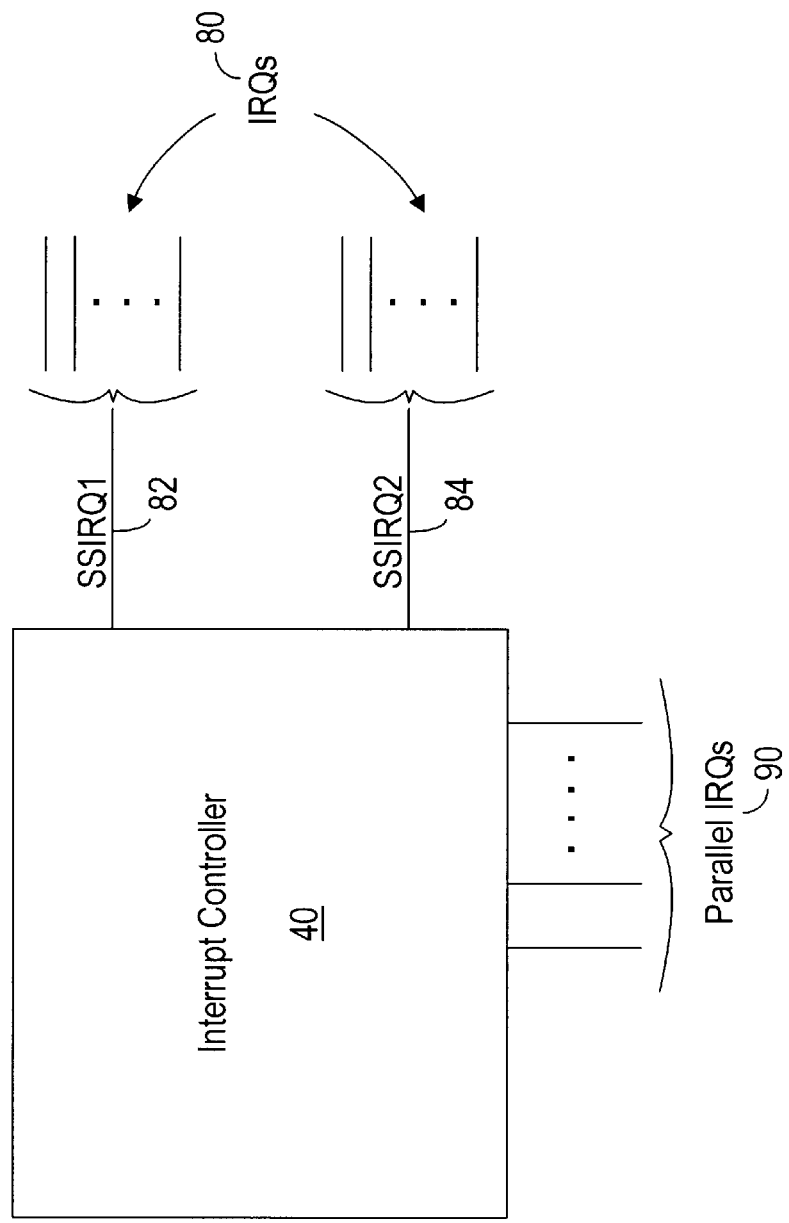
FIG. 4 is block diagram illustrating an interrupt controller configured to receive one or more serial scan interrupt request signals and one or more dedicated interrupt request signals, all in parallel.

Turning now to FIG. 4, an embodiment of interrupt controller 40 is illustrated receiving two serial scan interrupt inputs 82 to 84 and a plurality of parallel interrupt requests 90. Interrupt controller 40 may be implemented as a stand-alone device or as part of a larger integrated circuit, such as bus interface unit 28. As illustrated in FIG. 4, interrupt controller 40 may receive multiple interrupt request sources in parallel. Some of these sources may be serial interrupt scan inputs, such as serial scan interrupt request inputs 82 and 84, and other interrupt request sources may be dedicated interrupt request inputs, such as interrupt request 90. For example, in one embodiment the legacy ISA interrupt requests (IRQ 15-14, 12-3, 1) may be received each on a separate input conductor as parallel interrupt requests 90. Interrupt controller 40 may also include multiple general purpose interrupt requests for other interrupt sources, such as PCI or system management interrupt requests. Some of these other interrupt request sources may be received on dedicated input requests 90, or may be serially scanned on serial scan interrupt request inputs 82 or 84.

In one embodiment various inputs may be programmed as dedicated input requests or a serial scan interrupt request inputs. For example, eight general purpose interrupt request inputs may be provided. These may be configured to provide eight dedicated parallel interrupt request inputs in addition to dedicated parallel interrupt requests for the legacy ISA interrupts. Alternatively, one or two of these inputs may be configured as serial scan interrupt inputs 82 or 84. Also, two of the general purpose interrupt requests may be programmed to provide control signals associated with the serial scan interrupt request inputs 82 and 84, such as a latch enable and shift clock. Thus, according to one embodiment, eight general purpose interrupt request inputs may be provided which may be configured as eight parallel interrupt request, or five parallel interrupt request with one serial interrupt request input, or four parallel interrupt request with two serial interrupt request inputs. In one embodiment, each serial interrupt request input may scan up to eight interrupt requests 80. The numbers of interrupt request inputs provided above are merely illustrative and it is to be understood that any configuration of parallel and serial interrupt requests may be implemented within the constraints of technology. Receiving both dedicated interrupt requests in parallel with serially scanned interrupt requests provides an extremely flexible system for receiving interrupt requests to interrupt controller 40. Once interrupt requests are received either in parallel or serially into interrupt controller 40, they may then be mapped to their appropriate IRQ level or priority within the 8259 compatible and/or I/O APIC compatible interrupt logic within interrupt controller 40.

Figure 5:
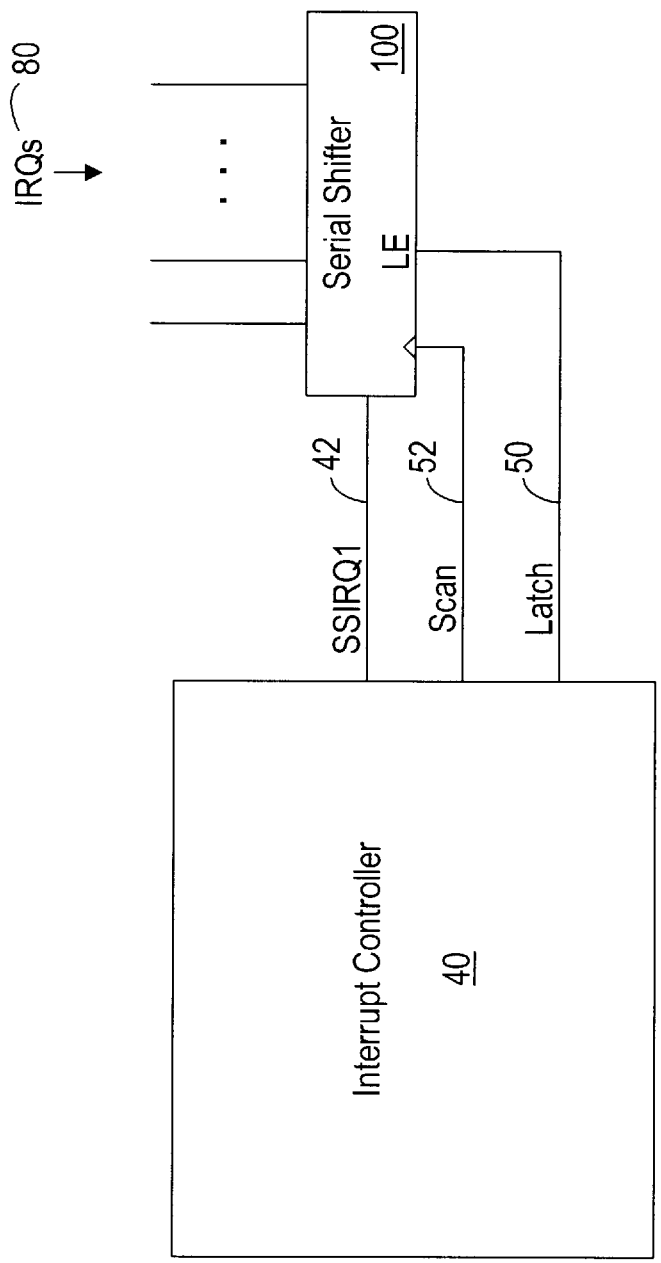
FIG. 5 is a block diagram showing an interrupt controller with external serial shifter for providing interrupt requests to a serial scan input of the interrupt controller.

Turning now to FIG. 5, a more detailed illustration of how interrupt requests 80 may be serially scanned into interrupt controller 40 is provided. Interrupt requests 80 may be received by serial shifter 100 in parallel. Interrupt requests 80 are scanned one at a time on serial interrupt request input 42 by interrupt controller 40. Interrupt controller 40 may assert latch signal 50 to latch the current state of interrupt requests 80 in parallel into serial shifter 100. Scan clock 52 may then be pulsed by interrupt controller 40 to serial shifter 100 to output the status of a different one of interrupt requests 80 onto serial scan interrupt request 42 for each pulse of scan clock 52. After all of the interrupt requests 80 have been serially scanned into interrupt controller 40, latch enable signal 50 may again be asserted and the process may be repeated. In one embodiment, serial shifter 100 may be a shift register. The interrupt requests 80 may be continuously scanned into interrupt controller 40 by continuously asserting scan signal 52 and periodically asserting latch enable 50 to load the new status of interrupt requests 80 after each interrupt request 80 has been serially outputted from shifter 100. Thus, the period of latch enable signal 50 may approximately correspond to the amount of time required to scan all of interrupt requests 80 out of serial shifter 100 into interrupt controller 40. Alternatively, latch signal 50 and scan signal 52 may be controlled by software commands.

As noted in regard to FIG. 2, the delay in updating the status of the serially scanned interrupt requests may result in spurious interrupts being generated. As described in conjunction with FIG. 2, serial interrupt requests may be ignored or masked for an amount of time to avoid spurious interrupts. The amount of time for which serial interrupt request may be masked may correspond to the period of latch signal 50. The period of latch signal 50 approximates the maximum amount of time required to serially update the status of one of interrupt requests 80.

Figure 6:
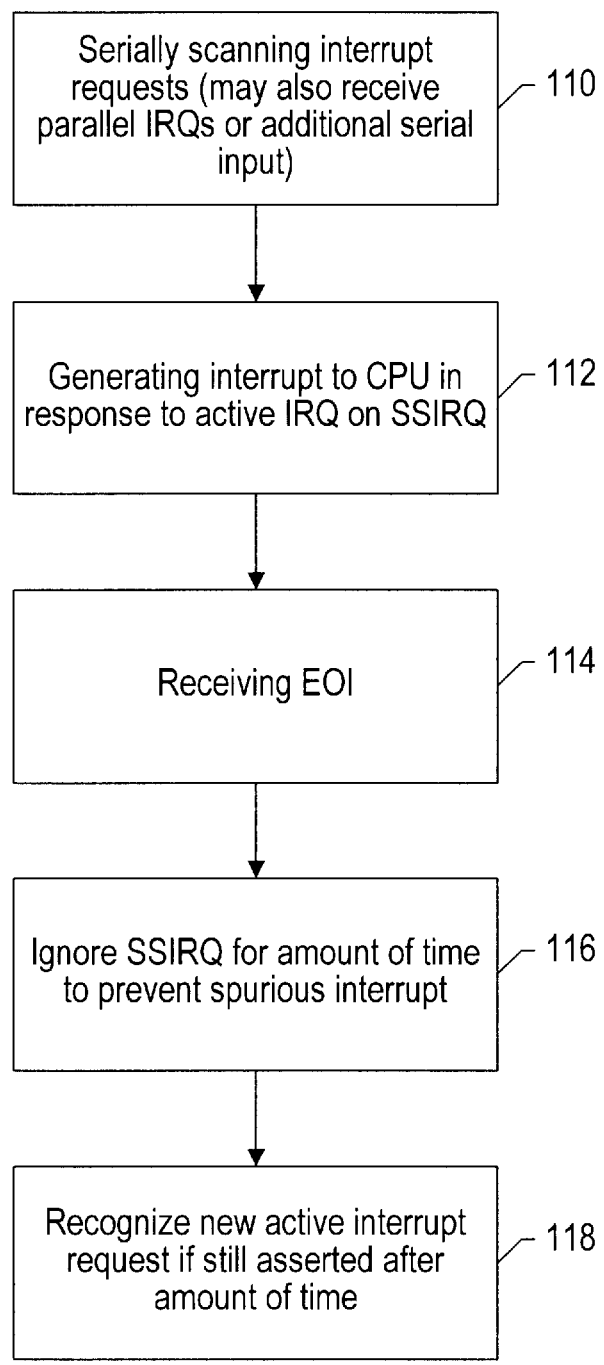
FIG. 6 is a flow diagram of a method for preventing spurious interrupts when serially scanning interrupt requests.

Turning now to FIG. 6, a method for receiving interrupt requests is illustrated. The method may include serially scanning interrupt requests into an interrupt controller, as indicated at 110. Other interrupt requests may be received in parallel to the serially scanned interrupt requests. The other interrupt requests may be received in parallel on an additional serial scan input, or on separate dedicated inputs. The interrupt controller may generate an interrupt to a CPU in response to an active one of the interrupt requests received on the serial scan input, as indicated at 112. Upon completion of service of the interrupt, the interrupt controller may receive an end of interrupt (EOI) indication, as indicated at 114. The interrupt controller may ignore active serially scanned interrupt requests for an amount of time after receiving the EOI in order to prevent spurious interrupts. As discussed above, the latency in updating the status of serial scanned interrupts due to the serial scan delay may result in a spurious interrupt if the interrupt has been cleared, but still appears asserted to interrupt controller due to the serial scan latency, and an EOI for that interrupt source has been received. To prevent such spurious interrupts serial scan interrupt requests may be masked or ignored for an amount of time following an EOI, as indicated at 116. All serial interrupts may ignored or alternatively serial interrupts associated with the just received EOI may be ignored. If the serially scanned interrupt status is already inactive, then no ignoring or masking is required. If the serial scanned interrupt request status is still active at the end of the mask duration, then the interrupt controller recognizes a new active interrupt request, as indicated at 118.

Figure 7:
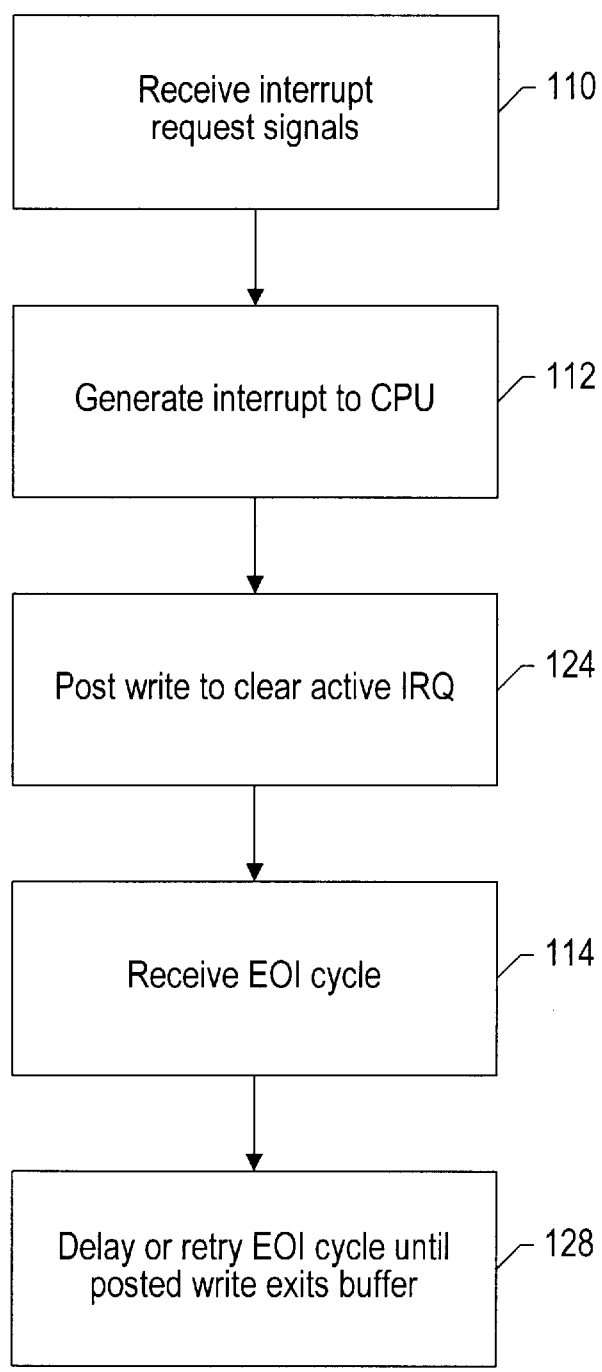
FIG. 7 is a flow diagram of a method for preventing spurious interrupts when writes to clear an interrupt source are posted.

Turning now to FIG. 7, another method for receiving interrupt requests is illustrated. Interrupt request may be serially scanned into an interrupt controller or received on parallel inputs or both, as indicated at 120. The interrupt controller may generate an interrupt to a CPU in response to an active interrupt request, as indicated at 112. A write cycle to clear the active interrupt request may be posted in a bus interface device, as indicated at 124. An EOI cycle corresponding to the requested interrupt may be received by the interrupt controller, as indicated at 114. If the write to clear the active interrupt request is still pending in the write buffer, then a spurious interrupt might result if the EOI is recognized before the write to clear the interrupt request has reached its destination. To reduce the chance of such a spurious interrupt, the EOI cycle may be delayed or retried until the posted write exits the buffer, as indicated at 128. The method as illustrated in FIG. 7 may be combined with the method as illustrated in FIG. 6 to reduce the chance of spurious interrupts associated with serially scanned interrupt requests. By employing the method of FIGS. 6 and 7, the chance of spurious interrupts due to the serial scan latency and due to write posting delays may be reduced. It is also noted that the method of FIG. 7 may be beneficial in reducing spurious interrupts for both serially scanned interrupt requests and interrupt requests received in parallel Techniques for serially scanning interrupts and reducing spurious interrupts have been described. While specific embodiments of architectures, signals, configuration, functionality, and methods have been described, the invention is not limited to these specific embodiments. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A computer system, comprising:

a central processing unit(CPU);

an interrupt controller configured to provide a signal for causing an interrupt in said CPU, wherein said interrupt controller is coupled to a peripheral bus, and wherein said interrupt controller is included within a device comprising a first conductor configured to serially scan a plurality of interrupt request signals and provide the status of said plurality of interrupt request signals on a serial input;

wherein said device is further configured to receive an end of interrupt (EOI) indication;

wherein said device is further configured to mask said serial input from indicating an active interrupt request for an amount of time following receipt of an EOI, and wherein said amount of time approximately the maximum latency to serially scan one of said interrupt request signals to said serial input; and a peripheral device coupled to the peripheral bus, wherein said peripheral device is coupled to a different circuit board than said device.

2. The computer system as recited in claim 1, wherein the peripheral device comprises a magnetic or optical drive.

3. The computer system as recited in claim 1, wherein the peripheral device comprises a display for displaying a visual user interface, and wherein the display is coupled to the peripheral bus via a graphics device.

4. The computer system as recited in claim 1, wherein said EOI is initiated by said CPU upon completion of an interrupt service routine corresponding to an interrupt request.

5. The computer system as recited in claim 1, wherein said device is configured to mask said serial input from indicating an active interrupt request only for said interrupt request signals corresponding to the interrupt request for which said EOI was received.

6. The computer system as recited in claim 1, wherein said device is further configured not to mask said serial input if the status received on said serial input of the interrupt request signal corresponding to the EOI is already inactive when the EOI is received.

7. The computer system as recited in claim 1, wherein said device is further configured to post in a buffer a write cycle to clear the interrupt request corresponding to said EOI, and wherein said device is configured to cause said EOI cycle to be delayed or retried on said peripheral bus until said write to clear the interrupt request has exited said buffer.

8. The computer as recited in claim 7, wherein said device is configured to issue said posted write from said buffer to a second peripheral bus, wherein a device that generated the interrupt request corresponding to the EOI is coupled to said second peripheral bus.

9. The computer system as recited in claim 8, wherein said peripheral bus comprises a peripheral component interconnect (PCI) bus and said second peripheral bus comprises an industry standard architecture (ISA) bus.

10. The computer system as recited in claim 1, wherein said device further comprises a plurality of conductors each configured to receive a separate interrupt request signal in parallel with said plurality of interrupt request signals serially scanned on said first conductor.

11. The computer system as recited in claim 1, wherein said device further comprises a second conductor configured to serially scan a second plurality of interrupt request signals.

12. The computer system as recited in claim 1, further comprising a shift register external to said device, wherein said shift register is configured to receive said plurality of interrupt request signals, wherein said device further comprises a second conductor configured to provide a latch signal to said shift register to latch said interrupt request signals in parallel into said shift register and a third conductor configured to provide a shift signal to said shift register to serially shift the status of said interrupt request signals to said first conductor.

13. The computer system as recited in claim 12, wherein said latch signal is asserted periodically after all the interrupt request signals have been shifted out of said shift register, wherein said amount of time corresponds to at least one period of said latch signal.

14. A method for receiving interrupt requests in a computer system, comprising:
serially scanning a first plurality of interrupt request signals into a serial input in a device comprising an interrupt controller;
receiving an end of interrupt (EOI) indication in said device; and
ignoring an active interrupt request on said serial input for an amount of time following said receiving an EOI to prevent a spurious interrupt due to latency of said serially scanning, wherein said amount of time is approximately the maximum latency of said serially scanning to scan one of said interrupt request signals to said serial input.

15. The method as recited in claim 14, further comprising recognizing a new interrupt request if said serial input still indicates an active interrupt request after said amount of time.

16. The method as recited in claim 14, further comprising generating an interrupt to a central processing unit in response to an active one of said interrupt request signals.

17. The method as recited in claim 14, wherein said ignoring comprises ignoring only ones of said interrupt requests corresponding to the interrupt request for which said EOI was received.

18. The method as recited in claim 14, wherein said ignoring comprises not ignoring an active interrupt request on said serial input if the status received on said serial input of the interrupt request signal corresponding to the EOI is already inactive when the EOI is received.

19. The method as recited in claim 14, further comprising:
posting to a buffer in said device a write to clear the interrupt request corresponding to a received EOI; and
wherein said receiving an EOI comprises:
receiving an EOI cycle on a peripheral bus; and
causing said EOI cycle to be delayed or retried on said peripheral bus until said write exits said buffer.

20. The method as recited in claim 19, wherein said peripheral bus comprises a peripheral component interconnect (PCI) bus.

21. The method as recited in claim 14, further comprising receiving a second plurality of interrupt request signals, wherein each of said second interrupt request signals is received in parallel with each other and said plurality of interrupt request signals serially scanned.

22. The method as recited in claim 14, further comprising serially scanning a second plurality of interrupt request signals into said device in parallel with said serially scanning a first plurality of interrupt request signals.

23. The method as recited in claim 14, wherein said serially scanning comprises:
latching said first plurality of interrupt request signals in parallel into a shift register external to said device; and
serially shifting said interrupt request signals out of said shift register and into said device.

24. The method as recited in claim 23, wherein said latching is repeated periodically after all the interrupt requests have been shifted out said shift register, wherein said amount of time corresponds to at least one period of said latching.

25. A computer system, comprising:
a central processing unit (CPU);
an interrupt controller configured to provide a signal for causing an interrupt in said CPU, wherein said interrupt controller is coupled to a peripheral bus, and wherein said interrupt controller is included with a device comprising a first conductor configured to receive at least one interrupt request signal;
wherein said device is further configured to receive an end of interrupt (EOI) indication;
wherein said device is further configured to post in a buffer a write cycle to clear an interrupt request corresponding to said EOI, and wherein said device is configured to receive said EOI as an EOI cycle on said peripheral bus, and wherein said device is further configured to cause said EOI cycle to be delayed or retried on said peripheral bus until said write to clear the interrupt request has exited said buffer; and
a peripheral device coupled to the peripheral bus, wherein said peripheral device is coupled to a different printed circuit board than said device.

26. The computer system as recited in claim 25, wherein the peripheral device comprises a magnetic or optical storage drive.

27. The computer system as recited in claim 25, wherein the peripheral device comprises a display for displaying a visual user interface, and wherein the display is coupled to the peripheral bus via a graphics device.

28. The computer system as recited in claim 25, wherein said EOI is initiated by said CPU upon completion of an interrupt service routine corresponding to the interrupt request.

29. The computer as recited in claim 25, wherein said device is configured to issue said posted write from said buffer to a second peripheral bus, wherein a device that generated the interrupt request corresponding to the EOI is coupled to said second peripheral bus.

30. The computer system as recited in claim 29, wherein said peripheral bus comprises a peripheral component interconnect (PCI) bus and said second peripheral bus comprises an industry standard architecture (ISA) bus.

31. The computer system as recited in claim 25, wherein the first conductor is configured to serially scan a plurality of interrupt request signals and provide the status of said plurality of interrupt request signals on a serial input, and wherein said device is further configured to mask said serial input from indicating an active interrupt request for an amount of time following receipt of said EOI.

32. The computer system as recited in claim 31, wherein said amount of time is approximately the maximum latency to serially scan one of said interrupt request signals to said serial input.

33. The computer system as recited in claim 31, wherein said amount of time is programmable.

34. The computer system as recited in claim 31, wherein said device is configured to mask said serial input from indicating an active interrupt request only for said interrupt request signals corresponding to the interrupt request for which said EOI was received.

35. The computer system as recited in claim 31, wherein said device is further configured not to mask said serial input if the status received on said serial input of the interrupt request signal corresponding to the EOI is already inactive when the EOI is received.

36. The computer system as recited in claim 31 wherein said device further comprises a plurality of conductors each configured to receive a separate interrupt request signal in parallel with said plurality of interrupt request signals serially scanned on said first conductor.

37. The computer system as recited in claim 31, wherein said device further comprises a second conductor configured to serially scan a second plurality of interrupt request signals.

38. The computer system as recited in claim 31, further comprising a shift register external to said device, wherein said shift register is configured to receive said plurality of interrupt request signals, wherein said device further comprises a second conductor configured to provide a latch signal to said shift register to latch said interrupt request signals in parallel into said shift register and a third conductor configured to provide a shift signal to said shift register to serially shift the status of said interrupt request signals to said first conductor.

39. The computer system as recited in claim 38, wherein said latch signal is asserted periodically after all the interrupt request signals have been shifted out of said shift register, wherein said amount of time corresponds to at least one period of said latch signal.

40. A method for receiving interrupt requests in a computer system, comprising:

posting, to a buffer in a device, a write to clear an interrupt request;

receiving an end of interrupt (EOI) cycle for said interrupt request on a peripheral bus in said device;

causing said EOI cycle to be delayed or retried on said peripheral bus until said write exits said buffer;

serially scanning a first plurality of interrupt request signals into a serial input in a device comprising an interrupt controller; and ignoring an active interrupt request on said serial input for an amount of time following said receiving an EOI to prevent a spurious interrupt due to latency of said serially scanning.

41. The method as recited in claim 40, wherein said peripheral bus comprises a peripheral component interconnect (PCI) bus.

42. The method as recited in claim 40, wherein said EOI cycle is initiated by a CPU upon completion of an interrupt service routine corresponding to the interrupt request.

43. The method as recited in claim 40, further comprising issuing the posted write to clear the interrupt request from said buffer to a second peripheral bus, wherein a peripheral device that generated the interrupt request corresponding to the EOI cycle is coupled to the second peripheral bus.

44. The method as recited in claim 43, wherein said peripheral bus comprises a peripheral component interconnect (PCI) bus and said second peripheral bus comprises an industry standard architecture (ISA) bus.

45. The method as recited in claim 40, wherein said amount of time is approximately the maximum latency of said serially scanning to scan one of said interrupt request signals to said serial input.

46. The method as recited in claim 40, further comprising recognizing a new interrupt request if said serial input still indicates an active interrupt request after said amount of time.

47. The method as recited in claim 40, further comprising generating an interrupt to a central processing unit in response to an active one of said interrupt request signals.

48. The method as recited in claim 40, wherein said ignoring comprises not ignoring only ones of said interrupt requests corresponding to the interrupt request for which said EOI was received.

49. The method as recited in claim 40, wherein said ignoring comprises not ignoring an active interrupt request on said serial input if the status received on said serial input of the interrupt request signal corresponding to the EOI is already inactive when the EOI is received.

50. The method as recited in claim 40, further comprising receiving a second plurality of interrupt request signals, wherein each of said second interrupt request signals is received in parallel with each other and said plurality of interrupt request signals serially scanned.

51. The method as recited in claim 40, further comprising serially scanning a second plurality of interrupt request signals into said device in parallel with said serially scanning a first plurality of interrupt request signals.

52. The method as recited in claim 40, wherein said serially scanning comprises:

latching said first plurality of interrupt request signals in parallel into a shift register external to said device; and serially shifting said interrupt request signals out of said shift register and into said device.

53. The method as recited in claim 52, wherein said latching is repeated periodically after all the interrupt request have been shifted out of said shift register, wherein said amount of time corresponds to at least one period of said latching.

\* \* \* \* \*

UNITED STATES PATENT AND TRADEMARK OFFICE
CERTIFICATE OF CORRECTION

PATENT NO. : 6,263,395 B1
DATED : July 17, 2001
INVENTOR(S) : Ferguson et al.

Page 1 of 1

It is certified that error appears in the above-identified patent and that said Letters Patent is hereby corrected as shown below:

Column 12,
Line 4, please insert -- is -- between "time" and "approximately".
Line 8, please insert -- printed -- between "different" and "circuit".
Line 32, please insert -- receive said EOI as an EOI cycle on said peripheral bus, and wherein said device is further configured to -- between "to" and "cause".

Column 13,
Line 59, please insert -- of -- between "out" and "said".

Column 16,
Line 15, please delete "not" after "ignoring comprises".

Signed and Sealed this

Fourteenth Day of May, 2002

Attest:

JAMES E. ROGAN
Attesting Officer
Director of the United States Patent and Trademark Office